US012651991B2

(12) United States Patent
Deeg

(10) Patent No.: US 12,651,991 B2
(45) Date of Patent: Jun. 9, 2026

(54) ARRANGEMENT AND METHOD FOR DETERMINING THE OPERATIONAL PERFORMANCE OF A ROTATING ELECTRIC MACHINE

(71) Applicant: Siemens Aktiengesellschaft, Munich (DE)

(72) Inventor: Christian Deeg, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 806 days.

(21) Appl. No.: 17/923,821

(22) PCT Filed: Apr. 23, 2021

(86) PCT No.: PCT/EP2021/060642
§ 371 (c)(1),
(2) Date: Feb. 28, 2023

(87) PCT Pub. No.: WO2021/224024
PCT Pub. Date: Nov. 11, 2021

(65) Prior Publication Data
US 2023/0396201 A1 Dec. 7, 2023

(30) Foreign Application Priority Data

May 8, 2020 (EP) .................................... 20173618

(51) Int. Cl.
*H02K 11/00* (2016.01)
*H02K 11/20* (2016.01)
*H02P 23/14* (2006.01)

(52) U.S. Cl.
CPC .......... *H02P 23/14* (2013.01); *H02K 11/0094* (2013.01); *H02K 11/20* (2016.01)

(58) Field of Classification Search
CPC . H02P 23/14; H02P 2207/01; H02K 11/0094; H02K 11/20; G05B 23/0221; G05B 19/042; G05B 2219/37537
See application file for complete search history.

(56) References Cited

U.S. PATENT DOCUMENTS 5,739,698 A * 4/1998 Bowers ................. H02P 29/024
                                                        324/545
6,138,078 A * 10/2000 Canada .................. H02K 11/33
                                                        702/56

(Continued)

FOREIGN PATENT DOCUMENTS

CN          1186379 A      7/1998
CN        108551286 A      9/2018

(Continued)

OTHER PUBLICATIONS

Boglietti A et al; "Induction Motor Equivalent Circuit Including the Stray Load Lasses in the Machine Power Balance"; IEEE Transactions on Energy Conversion; IEEE Service Center; Piscataway, NJ, US; vol. 23; No. 3; Jan. 9, 2008; pp. 796-803; XP011227689; ISSN: 0885-8989, 001: 10.1109/TEC.2008.921467.

(Continued)

*Primary Examiner* — Manuel A Rivera Vargas
(74) *Attorney, Agent, or Firm* — Henry M. Feiereisen LLC

(57) ABSTRACT

An arrangement for determining the operational performance of a rotating electric machine connected to an operating voltage includes a sensor apparatus and a computing device. The sensor apparatus is designed to capture a stray magnetic field outside the machine and to calculate from the captured stray magnetic field a slip frequency and a synchronous frequency. An enhanced equivalent circuit diagram including predetermined, machine-specific parameters is stored on the computing device. The computing device is (Continued)

configured to determine, on the basis of the calculated slip frequency and synchronous frequency, a slip and then to determine the operational performance of the machine by the enhanced equivalent circuit diagram.

18 Claims, 2 Drawing Sheets

(56)                    References Cited

U.S. PATENT DOCUMENTS

| | | | |
|---|---|---|---|
| 6,199,018 B1 * | 3/2001 | Quist | G05B 23/0221 |
| | | | 706/912 |
| 9,170,303 B2 * | 10/2015 | Lu | H02P 23/14 |
| 2012/0038298 A1 * | 2/2012 | Villwock | H02P 21/16 |
| | | | 318/400.11 |
| 2019/0267923 A1 | 8/2019 | Anders et al. | |

FOREIGN PATENT DOCUMENTS

| | | | |
|---|---|---|---|
| DE | 102008020656 A1 | 10/2009 | |
| DE | 10 2012 103 245 A1 | 10/2013 | |
| EP | 3 322 088 A1 | 5/2018 | |

OTHER PUBLICATIONS

Schröder Dierk; "Elektrische Antriebe—Regelung Von Antriebssystemen (Parameter determination with conventional machine testing methods)"; Vieweg 2015; XP093240074.

Lamine A: et al; "markDynamic induction machine modelling considering the stray load lasses /mark"; Universities Power Engineering Conference; 2004. UPEC 2004. 39th Inter national Bristol; UK Sep. 6-8, 2004; Bd. 2; Jan. 1, 2004; pp. 582-686; XP093240022; Piscataway, NJ, USA; ISBN: 978-1-86043-365-8; Retrieved from the internet:. https://ieeexplore.ieee.org/stampPDF/getPDF.jsp?tp-Sarnumber-1492086&ref=aH R0CHM6Ly9pZWVieHBsb3JlLmllllZ WUub3JnL2RvY3VtZW50LzEDOTlwODY =.

Levi E. et al; "Impact of Stray Load Lasses on Vector Control Accuracy in Current-Fed Induction Motor Drives"; IEEE Transactions on Energy Conversion.; vol. 21; No. 2; Jan. 6, 2006; pp. 442-450; XP093240016; US; ISSN: 0885-8969; 001: 10.1109/TEC. 2006.874241 Retrieved from the internet: https://ieeexplore.ieee. org/stampPDF/getPDF.jsp?tp=&arnumber=1634591 &ref= aHR0cHM6Ly9pZWVieHBsb3Jl.JIL. mllZWUub3JnL2RvY3VtZW50LzE2MzQ1 OTE =.

Beitz: "Dubbel—Taschenbuch für den Maschinenbau, 20. Auflage"; In: "Dubbel—Taschenbuch für den Maschinenbau"; Jan. 1, 2001; Springer, Berlin [u.a.] 027081; XP055281024; ISBN: 978-3-540-67777-2.

Bocker, Joachim: "Elektrische Antriebe—Regelung Von Antriebssystemen", 4.Auflage; In: "Elektrische Antriebe—Regelung Von Antriebssystemen 4.Auflage"; Dec. 18, 2015; Springer Berlin/Heidelberg; Berlin; Heidelberg; XP55905129; ISBN: 978-3-662-62699-3.

PCT International Search Report and Written Opinion of International Searching Authority mailed Jul. 21, 2021 corresponding to PCT International Application No. PCT/EP2021/060642 filed Apr. 23, 2021.

* cited by examiner

ARRANGEMENT AND METHOD FOR DETERMINING THE OPERATIONAL PERFORMANCE OF A ROTATING ELECTRIC MACHINE

CROSS-REFERENCES TO RELATED APPLICATIONS

This application is the U.S. National Stage of International Application No. PCT/EP2021/060642, filed Apr. 23, 2021, which designated the United States and has been published as International Publication No. WO 2021/224024 A1 and which claims the priority of European Patent Application, Serial No. 20173618.8, filed May 8, 2020, pursuant to 35 U.S.C. 119 (a)-(d).

BACKGROUND OF THE INVENTION

The invention relates to an arrangement for determining the operational performance of a rotating electric machine, in particular an asynchronous machine, connected to an operating voltage, wherein the arrangement comprises a sensor apparatus and a computing facility.

The invention also relates to a method for determining the operational performance of a rotating electric machine connected to an operating voltage.

Furthermore, the invention relates to a computer program comprising commands which have the effect, during the execution of the program, that an arrangement of the aforementioned type carries out a method of the aforementioned type.

Furthermore, the invention relates to a computer-readable medium, for example, a volatile or non-volatile storage medium with a computer program of the aforementioned type.

In addition, the invention relates to a system comprising a rotating electric machine and an arrangement of the aforementioned type.

With the advancing digitization in industrial drive technology, IoT devices are coming increasingly to prominence, for example, IoT sensor apparatuses, which detect status variables (temperature, vibration, rotary speed, etc.) of system units, for example asynchronous machines and pass them on for further processing. In order to construct these devices, for example IoT devices, cost-effectively and robustly, external sensors are often dispensed with, and therefore particular variables of interest cannot be measured directly. Thus, for example, with asynchronous machines, in the case of an operating point establishment (for example torque, power) only a synchronous frequency and a slip frequency of the magnetic stray-field variables are available as a basis for the determination. Typically, from the slip frequency, synchronous frequency, nominal torque and nominal speed, the current operating point is established by linear interpolation or extrapolation. This method is restricted to statements regarding torque and power. The error arising through the linearization—depending upon the size/design of the electric machine—is typically between 5% and 10% or 16% (sometimes significantly higher). The method is therefore too inaccurate.

The object of the present invention can thus be regarded as providing methods and systems which enable an improved determination of the operational performance in rotating electric machines.

SUMMARY OF THE INVENTION

The object is solved with an arrangement of the aforementioned type according to the invention in that the sensor apparatus is designed to detect a leakage magnetic field outside the machine and from the detected leakage magnetic field, to calculate a slip frequency $f_2$ and a synchronous frequency $f_1$ and/or a synchronous speed, wherein an enhanced equivalent circuit diagram having a predetermined machine-specific parameter $R_1$, $X_1$, $R_{fe}$, $X_h$, $R'_2$, $X'_2$, $R_{zus}$ is stored on the computing facility and the computing facility is configured, on the basis of the calculated slip frequency $f_2$ and the synchronous speed $f_1$, to establish a slip s and subsequently, by means of the enhanced equivalent circuit diagram, the operational performance of the machine.

In relation to the present invention, the expression "connected to an operating voltage" should be understood to mean a state of the rotating electric machine in which the machine is connected to an operating voltage that is fixed (rigid network) or variable (inverter operation) in its amplitude and frequency.

Preferably, the control method of the inverter is known, so that the unknown inverter output voltage can be determined from the frequency $f_1$ established with the sensor.

It can be expedient if the computing facility has a first and a second computing unit, wherein the enhanced equivalent circuit diagram is stored on the first computing unit.

Furthermore, it can advantageously be provided that the first computing unit is designed to be structurally separate from the second computing unit and the sensor apparatus comprises the first computing unit.

In one embodiment, it can be advantageous if the computing facility further comprises a cloud computing unit, in particular a cloud server.

The cloud computing unit can be designed, in particular, as a cloud server and can be connected via a wireless link, in particular via an internet wireless connection to the first and/or second computing unit and/or to the sensor apparatus.

In addition, it can be expedient if at least one of the predetermined machine-specific parameters is an additional resistance value $R_{zus}$ characterizing additional losses. In this way, the additional losses can also be taken into account in the enhanced equivalent circuit diagram and thus in the establishment of the operating point. This can increase the accuracy of the establishment.

In addition, it can be advantageous if the computing facility further comprises a display apparatus which is configured to visualize the operational performance of the machine.

The object of the invention is also achieved according to the invention with a method of the aforementioned type, in that A) a leakage magnetic field is detected outside the machine (during operation of the machine), B) from the detected leakage magnetic field, a slip frequency $f_2$ and a synchronous speed $f_1$ are calculated, C) from the slip frequency $f_2$ and the synchronous frequency/synchronous speed $f_1$, a slip s is calculated, D) the slip s, the synchronous frequency $f_1$ and predetermined machine-specific parameters $R_1$, $X_1$, $R_{fe}$, $X_h$, $R'_2$, $X'_2$, $R_{zus}$ are used for establishing an operational performance of the machine by means of an enhanced equivalent circuit diagram of the machine.

In other words, the slip s, the synchronous frequency $f_1$ and predetermined machine-specific parameters $R_1$, $X_1$, $R_{fe}$, $X_h$, $R'_2$, $X'_2$, $R_{zus}$ are used as input variables for the enhanced equivalent circuit diagram with which the operational performance is calculated.

During the establishment of the operational performance, for example, a torque and/or a power, for example mechanical shaft power and/or a power factor and/or an efficiency level can be established.

Furthermore, it can advantageously be provided that the predetermined machine-specific parameters $R_1$, $X_1$, $R_{fe}$, $X_h$, $R'_2$, $X'_2$, $R_{zus}$ comprise an additional resistance $R_{zus}$ characterizing additional losses.

In addition, it can be expedient if an operating point of the machine is established from the established operational performance.

Further advantages can arise if the established operational performance of the machine is visualized.

In one embodiment, it can be provided that the enhanced equivalent circuit diagram is transferred to the location at which the leakage magnetic field is measured in order, for example, to be placed at least in intermediate storage there and steps A to D are carried out on the machine.

Furthermore, it can be provided that the steps A to C are carried out on the machine (for example in a sensor apparatus arranged on the machine), the slip s and the synchronous frequency $f_1$ are sent into a cloud and the step D is carried out in the cloud.

It is also conceivable that steps A and B are carried out on the machine (for example in a sensor apparatus arranged on the machine) and that steps C and D are carried out in the cloud.

In addition, the object is achieved according to the invention with a system of the aforementioned type in that the machine comprises a machine housing, wherein the sensor apparatus is arranged, in particular fastened, on an exterior of the machine housing, wherein the sensor apparatus is preferably designed as an IIoT sensor apparatus.

BRIEF DESCRIPTION OF THE DRAWING

The invention will now be described and explained in greater detail making reference to the exemplary embodiments illustrated in the figures, in which.

DETAILED DESCRIPTION OF PREFERRED EMBODIMENTS

Figure 1:
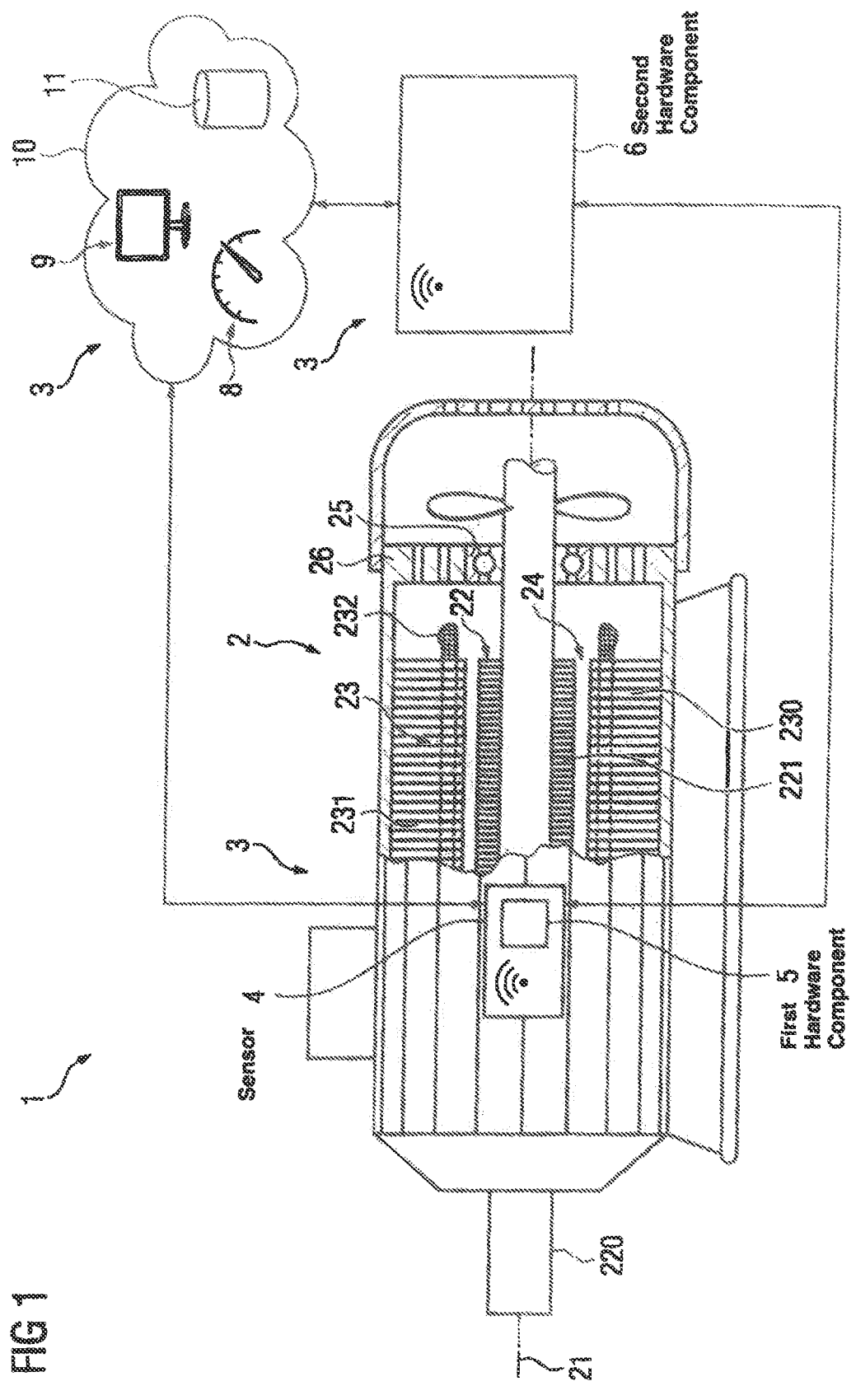
FIG. 1 shows a system consisting of an asynchronous machine and an IIoT infrastructure.

In the exemplary embodiments and drawings, the same or similarly acting elements can each be provided with the same reference characters.

Reference is made firstly to FIG. 1. It shows, in schematic form, a system 1 comprising a rotating electric machine 2 and an arrangement 3 for establishing the operational performance of the machine 2. The machine 2 can be connected to an operating voltage and be in operation. The machine 2 is configured as an asynchronous machine, for example, as an asynchronous motor or generator and has a rotor 22 which can be rotated about a rotation axis 21, and a stator 23 surrounding the rotor 22, wherein between the rotor 22 and the stator 23, a gap 24 is formed which is designed, in particular, as an air gap. The rotation axis 21 defines an axial direction and a radial direction. The rotor 22 comprises a shaft 220 and a rotor laminated core assembly 221. The stator 23 comprises a stator laminated core assembly 230 with stator windings 231, wherein the stator laminated core assembly 230 is constructed from a plurality of laminated electric steel sheets. The stator windings 231 extend in the axial direction through the stator laminated core assembly 230 and form winding heads 232 at the axial ends of the stator laminated core assembly 230. The shaft 220 of the rotor 22 is mounted via bearings 25. The rotor 22 and the stator 23 are accommodated in a closed machine housing 26.

The arrangement 3 comprises a sensor apparatus 4 and a computing facility 5, 6, 8, 9. The computing facility 5, 6, 8, 9 can in general comprise hardware and/or software components. For example, it can comprise a first 5 and a second hardware component 6, a display apparatus 8 and a cloud computing unit 9.

The hardware components 5, 6, the display apparatus 8 and the cloud computing unit 9 can all be designed to be structurally separate from one another. The sensor apparatus 4, the first hardware component 5 and second hardware component 6 can have a (for example, bilateral, preferably wireless-based) data connection to a cloud, for example, to the cloud computing unit 9. The second hardware component 6 can be designed, for example, as a mobile device, for example a hand-held device, such as a smartphone or a tablet. The display apparatus 8 can be configured, for example, as a dashboard.

The first hardware component 5 can be arranged in the sensor apparatus 4. The sensor apparatus 4 and/or the first hardware component 5 can be able to be connected via a (for example, bilateral) wireless connection to the second hardware component 6 for the purpose of data transfer.

The sensor apparatus 4 can be designed as an industrial internet of things (IIoT) sensor apparatus (IIoT device) and is fastened to the machine housing 26, and has small dimensions compared with the machine 2. For example, the sensor apparatus 4 is approximately five to ten times smaller than the machine 2 (see FIG. 1). The machine 2 can be designed as a rib-cooled asynchronous machine, wherein the sensor apparatus 4 can be fastened to the cooling ribs of the asynchronous machine.

The sensor apparatus 4 is designed to detect a leakage magnetic field outside the machine 2 and from the detected leakage magnetic field, to calculate a slip frequency $f_2$ and a synchronous frequency $f_1$. The measurement can take place, for example, with a coil provided for this purpose within the sensor apparatus housing. The signal measured at the coil can be better bandwidth throttled. This has further advantages for a subsequent sampling during the A/D conversion. The measurement can also take place by means of a chip sensor within the sensor apparatus housing. The chip sensor can be more cost effective than the coil. The calculation of the slip frequency $f_2$ and the synchronous frequency $f_1$ can take place, for example, by means of the first hardware component 5 or the second hardware component 6, in particular in the cloud, for example, on the cloud computing unit 9. For example, the aforementioned calculation of the frequencies from the detected leakage magnetic field can take place with the aid of digital signal processing, in particular with an FFT and/or a frequency counting method.

It should be noted at this point that the sensor apparatus 4 does not have to be linked to any machine sensors within (or outside) the machine 2. It is conceivable that the sensor apparatus 4 is linked to further sensors (which however are not involved in a magnetic field measurement), preferably on a wireless basis, for example, by means of Bluetooth, for example, for the purpose of temperature and/or vibration measurement. For determining the operational performance as described here, no costly and maintenance-intensive sensors are needed which are able, for example, to measure current or voltage. Therefore, both the arrangement 3 and also the sensor apparatus 4 are very economical and maintenance-friendly. Therein, a torque and/or a power level, for example, mechanical shaft power and/or a power factor and/or an efficiency level can be established.

Figure 2:
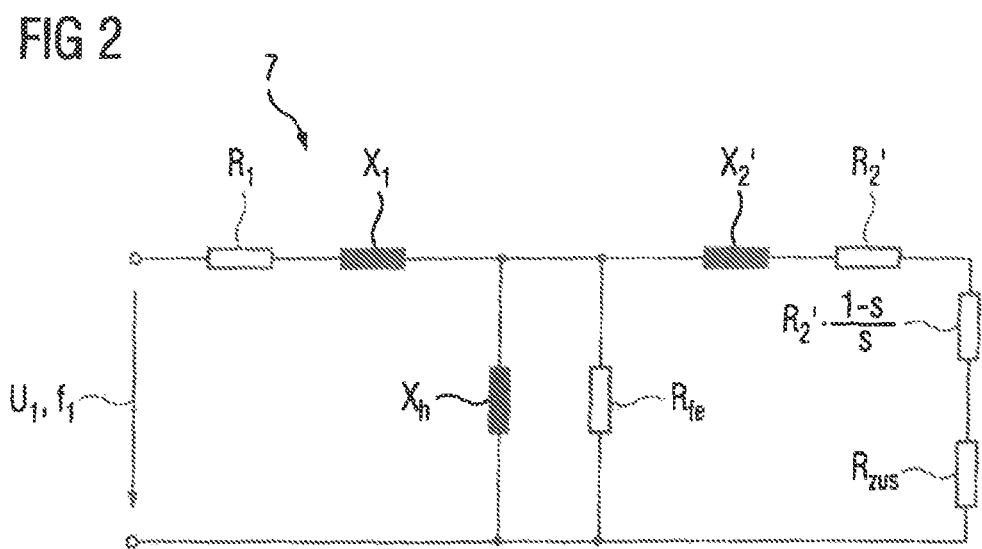
FIG. 2 shows an enhanced equivalent circuit diagram.

On the computing facility 5, 6, 8, 9, in particular on the first hardware component 5 or on the cloud computing unit 9, an enhanced equivalent circuit diagram 7 having predetermined machine-specific parameters—main inductance $X_h$ (main flux), stator inductance $X_1$ and rotor inductance $X'_2$ (leakage fluxes), rotor resistance $R'_2$ (rotor winding losses), stator resistance $R_1$ (stator winding losses), $R_{fe}$ (iron losses) and $R_{zus}$ (additional losses)—can be stored (see FIG. 2). The computing facility 5, 6, 8, 9 is configured, on the basis of the calculated slip frequency $f_2$ and synchronous frequency $f_1$, to establish a slip s and subsequently by means of the enhanced equivalent circuit diagram 7, the operational performance of the machine 2. Therein, the parameters, the slip s, the synchronous speed $f_1$ and a voltage $U_1$ are used as input variables for the enhanced equivalent circuit diagram 7 and the operational performance is calculated.

The enhanced equivalent circuit diagram 7 can be placed, for example, on the first hardware component 5 and thus—if the first hardware component 5 is part of the sensor apparatus 4—can be stored on the sensor apparatus 4.

If the equivalent circuit diagram 7 is not stored on the first hardware component 5, it can be downloaded, for example, by means of the second hardware component 6 from the cloud 10, for example, from the cloud computing unit 9 or from a cloud database 11 and transferred to the first hardware component 5. In this case, it can be expedient if step D is carried out, for example, on the hardware component 5.

As mentioned above, a predetermined machine-specific parameter can be an additional resistance $R_{zus}$ characterizing additional losses. In this way, the additional losses are also taken into account in the establishment of the operating point. In this way, for example, when the additional losses are taken into account in a standardized manner, their retroactive effect on the operating variables established with the equivalent circuit diagram can be detected.

The display apparatus 8, for example, the dashboard can be configured to visualize the established operational performance of the machine 2. The display apparatus 8 can be arranged, for example, in the cloud (FIG. 1) or linked to the cloud.

Figure 3:
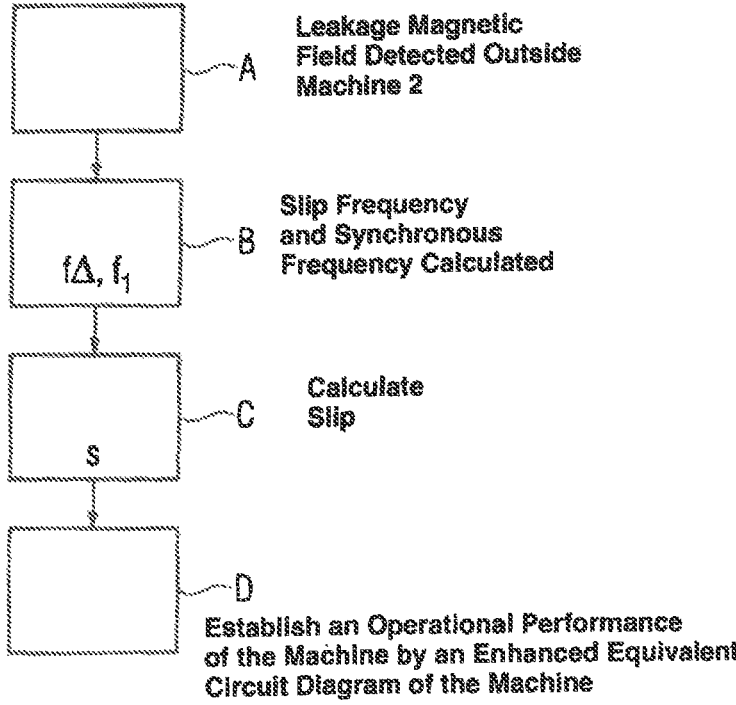
FIG. 3 shows a flow diagram of a method.

FIG. 3 shows an embodiment of a method for determining the operational performance of a rotating electric machine 2 connected to an operating voltage, during its operation.

In step A, a leakage magnetic field is detected outside the machine 2. This can take place, for example, by means of the aforementioned sensor apparatus 4. From the detected leakage magnetic field, a slip frequency $f_2$ and a synchronous frequency $f_1$ are calculated (step B), from which in step C, a slip s is calculated. The slip s, the synchronous speed $f_1$ and predetermined machine-specific parameters $R_1$, $X_1$, $R_{fe}$, $X_h$, $R'_2$, $X'_2$, $R_{zus}$ are used for establishing an operational performance of the machine 2 by means of an enhanced equivalent circuit diagram of the machine 2. The parameters and the equivalent circuit diagram can be the parameters $R_1$, $X_1$, $R_{fe}$, $X_h$, $R'_2$, $X'_2$, $R_{zus}$ addressed in relation to FIGS. 1 and 2 and the equivalent circuit diagram 7.

For example, the parameters comprise the additional resistance $R_{zus}$ characterizing the additional losses.

An operating point of the machine 2 can be established from the established operational performance.

Before the measurement of the leakage magnetic field, the enhanced equivalent circuit diagram 7 can be transferred to the sensor apparatus 4 or to the first hardware component 5, in order to be placed into intermediate storage there, for example in a volatile or non-volatile memory store. By this means, for example, the data traffic can be optimized.

Furthermore, for example, the aforementioned steps A and B or A, B and C can be carried out on the machine 2 in the sensor apparatus 4, for example, by means of the first hardware component 5, wherein the slip s and the synchronous frequency $f_1$ are sent, for example, via the second hardware component 6 or by a direct route into the cloud 10, for example, to the cloud computing unit or into the cloud database 11, so that the steps C and D or the step D can be carried out in the cloud 10.

From the standpoint of the machine manufacturer, the equivalent circuit diagram 7 contains sensitive data, by which means the establishment of the operational performance in the cloud 10 can be preferred for safety reasons.

Furthermore, the computing facility can comprise a computer program which has commands which, on execution of the program by the computing facility, cause it to carry out the aforementioned method. The computer program can be stored, for example, on the cloud computing unit 9 and/or on the first hardware component 5 and/or on the second hardware component 6 and can comprise a plurality of modules which are distributed over different computing units, and can be executed in cooperation and correlated or independently of one another.

Although the invention has been illustrated and described in detail with exemplary embodiments, the invention is not restricted by the examples disclosed. Variations thereof can be derived by a person skilled in the art without departing from the scope of protection of the invention as defined by the following claims. In particular, the system described and the arrangement described can be improved by features which have been described or claimed in relation to the method and vice versa.

What is claimed is:

1. An arrangement for determining an operational performance of a rotating electric machine connected to an operating voltage, the arrangement comprising:
   a sensor apparatus configured to detect a leakage magnetic field outside the rotating electric machine and to calculate a slip frequency and a synchronous frequency from the detected leakage magnetic field; and
   a computing facility storing an enhanced equivalent circuit diagram of the rotating electrical machine, the enhanced equivalent circuit diagram comprising predetermined machine-specific parameters, with the predetermined machine-specific parameters comprising inductances characterizing fluxes, resistances characterizing losses, and an additional resistance characterizing additional losses, said computing facility configured to establish a slip based on the calculated slip frequency and synchronous frequency, and subsequently to establish the operational performance of the machine by using the slip, the synchronous frequency, the operating voltage, and the predetermined machine-specific parameters as input variables for the enhanced equivalent circuit diagram.

2. The arrangement of claim 1, wherein the computing facility comprises a first computing unit which stores the enhanced equivalent circuit diagram.

3. The arrangement of claim 2, wherein the computing facility further comprises a second computing unit, the first computing unit being structurally separate from the second computing unit, said sensor apparatus comprising the first computing unit.

4. The arrangement of claim 3, wherein the computing facility comprises a cloud computing unit connected to the first computing unit and/or second computing unit and/or to the sensor apparatus.

5. The arrangement claim 4, wherein the cloud computing unit comprises a cloud server.

6. The arrangement of claim 1, wherein the computing facility further comprises a display apparatus configured to visualize the operational performance of the electric machine.

7. A method for determining an operational performance of a rotating electric machine connected to an operating voltage, the method comprising steps:

A) detecting a leakage magnetic field outside the rotating electric machine;

B) calculating a slip frequency and a synchronous frequency from the detected leakage magnetic field;

C) calculating a slip from the slip frequency and the synchronous frequency; and D) establishing an operational performance of the rotating electrical machine by using the slip, the synchronous frequency and predetermined machine-specific parameters, with the predetermined machine-specific parameters comprising inductances characterizing fluxes, resistances characterizing losses, the operating voltage, and an additional resistance characterizing additional losses, as input variables for an enhanced equivalent circuit diagram of the rotating electrical machine.

8. The method of claim 7, further comprising establishing a torque and/or a power level and/or a power factor and/or an efficiency level during establishment of the operational performance.

9. The method of claim 8, wherein the power level is a mechanical shaft power.

10. A computer program embodied on a non-transitory computer readable medium, comprising commands which, when executed by a computing facility, causes the computing facility to carry out a method as set forth in claim 7.

11. A computer-readable storage medium, comprising a computer program as set forth in claim 10.

12. The method of claim 7, further comprising establishing an operating point of the electrical machine from the established operational performance.

13. The method of claim 7, further comprising visualizing the established operational performance of the electric machine.

14. The method of claim 7, further comprising:

transferring the enhanced equivalent circuit diagram to a location at which the leakage magnetic field is measured; and carrying out steps A to D on the rotating electrical machine.

15. The method of claim 7, further comprising:

carrying out steps A and B or A, B and C on the rotating electrical machine; and sending the slip and the synchronous frequency into a cloud so that steps C and D or step D are or is carried out in the cloud.

16. A system comprising:

a rotating electric machine connected to an operating voltage and including a machine housing; and an arrangement for determining an operational performance of the rotating electric machine, the arrangement comprising a sensor apparatus arranged on an exterior of the machine housing and configured to detect a leakage magnetic field outside the rotating electric machine and to calculate a slip frequency and a synchronous frequency from the detected leakage magnetic field, and a computing facility storing an enhanced equivalent circuit diagram of the rotating electrical machine, the enhanced equivalent circuit diagram comprising predetermined machine-specific parameters, with the predetermined machine-specific parameters comprising inductances characterizing fluxes, resistances characterizing losses, and an additional resistance characterizing additional losses, said computing facility configured to establish a slip based on the calculated slip frequency and synchronous frequency, and subsequently to establish the operational performance of the machine by using the slip, the synchronous frequency, the operating voltage, and the predetermined machine-specific parameters as input variables for the enhanced equivalent circuit diagram.

17. The system of claim 16, wherein the sensor apparatus is fastened to an exterior of the machine housing.

18. The system of claim 16, wherein the sensor apparatus is configured as an industrial internet of things (IIoT) sensor apparatus.

\* \* \* \* \*